United States Patent [19]

Federici et al.

[11] Patent Number: 4,704,420
[45] Date of Patent: Nov. 3, 1987

[54] HIGHLY FUNCTIONAL FLUORINATED POLYISOCYANATES AND VARNISHES OBTAINED THEREFROM

[75] Inventors: Franco Federici, Busto Arsizio; Giorgio Pin, Olgiate Olona; Ennio Cozzi, Cantalupo, all of Italy

[73] Assignee: Montedison S.p.A., Milan, Italy

[21] Appl. No.: 938,243

[22] Filed: Dec. 5, 1986

[30] Foreign Application Priority Data

Dec. 12, 1985 [IT] Italy .................. 23184 A/85

[51] Int. Cl.⁴ ............................ C08G 18/38
[52] U.S. Cl. ....................... 524/233; 252/182; 524/308; 524/560; 524/726; 524/759; 524/760; 524/795; 528/65; 528/66; 528/76; 528/77; 560/25; 560/26; 560/115; 560/116; 560/132; 560/158
[58] Field of Search ............... 524/233, 308, 560, 726, 524/759, 760, 795; 252/182; 560/25, 26, 115, 116, 132, 158; 528/65, 66, 76, 77

[56] References Cited

U.S. PATENT DOCUMENTS 3,657,320  4/1972  Anello et al. ............... 560/26

Primary Examiner—Maurice J. Welsh
Attorney, Agent, or Firm—Stevens, Davis, Miller & Mosher

[57] ABSTRACT

Highly functional fluorinated polyisocyanates of the formula:

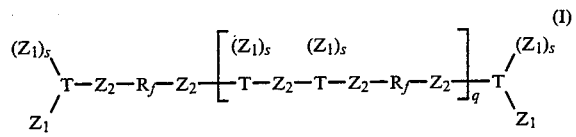

wherein
$Z_1$ represents the functional group —O—CO—NH—R—NCO;
$Z_2$ represents the difunctional group —O—CO—NH—R—NH—CO—O—;
$R_f$ is a radical derived from fluoropolyethers having a molecular weight between 500 and 7000;
T represents a trivalent or tetravalent radical derived from a polyol;
q is zero or 1; and
s is 1 or 2.

Also, varnishes containing said highly functional fluorinated polyisocyanates of formula (I).

15 Claims, No Drawings

HIGHLY FUNCTIONAL FLUORINATED POLYISOCYANATES AND VARNISHES OBTAINED THEREFROM

DESCRIPTION OF THE INVENTION

The present invention relates to highly functional fluorinated polyisocyanates.

More particularly, the present invention relates to highly functional fluorinated polyisocyanates and to varnishes obtained from them.

Urethane polymers or polyisocyanates and their use, for instance as base products for preparing varnishes and paints, are per se well known in the art.

Generally, varnishes and paints consist of a solvent/-dispersing agent base wherein a polymeric product and, if desired, additives, such as pigments, anti-corrosion agents, anti-fouling agents, etc., are dissolved or dispersed to improve the properties of the paint itself when applied as film or surface coating.

Examples of polymeric products are the urethane resins, acrylic resins, polyvinylchloride, etc.

Polyurethane or polyisocyanic paints and varnishes have the property of hardening during the evaporation of the solvent or of the dispersing agent, and thus giving therefore a surface coating which besides adhering well to the surface on which it is applied, shows a very good resistance to weathering agents and very good physical characteristics such as hardness, water-repellance, UV ray resistance, etc.

An important application field for paints, in particular for those based on polyurethanes, is the marine field wherein the paint besides very good anti-corrosion coating properties, must have an anti-fouling function to avoid the formation and growth of any animal and-/or vegetable life forms on the hull of boats and ships.

Those vegetable/animal life forms have serious drawbacks in that besides damaging the protecting film or the paint which coats the keel, they represent a remarkable cause of friction which weighs heavily on fuel consumption.

To remove said vegetable or animal life forms, boats of any size are sheltered in dry docks where they are scaled and painted again.

Such a maintenance is not only very expensive but requires long operation times which so far as commercial boats are concerned, weigh heavily and negatively on the running costs.

Furthermore, as to competition or racing boats, the presence of vegetable scales with the consequent surface roughness of the keel, affects negatively their sporting purposes.

In fact, in this type of boat the protective paint film itself must have a coefficient of friction near to that of very smooth surfaces, for instance glass or mirror-like aluminum, in order to lower as much as possible the advancing resistance or drag of the hull.

Therefore, there have been suggested and widely described in the literature paints to be used in particular in the marine field, by which it was attempted to solve the above-mentioned problems and above all to reduce and make easier the maintenance for cleaning and repainting of large size boats.

Some of these paints, such as for instance, those described in European Patent Application No. 46,354 or in U.S. Pat. No. 4,407,997, contain biocidal compounds, for the most part based on copper or tin, which are very slowly released according to different reaction mechanisms and which inhibit the growth of vegetable and/or animal life forms (such as barnacles) on the parts on which they are applied.

A drawback of these paints is that they have only a limited effect over a period of time as well as a biocide-polluting action on the sea flora and auna.

Paints based on fluorinated resins and polymers have been suggested as alternatives to paints containing anti-fouling additives.

These fluorinated resins, in particular the fluorinated polyurethane resins such as for instance those described in U.S. Pat. No. 4,132,681, allow one to prepare paints showing good coating properties and which, when applied on hulls and boats, allow the easy removal of the vegetable and/or animal scales formed thereon. This last property can be improved by adding to the above-mentioned paints powdered fluorinated polymers such as tetrafluoroethylene which, as well known, is a material showing very good anti-adhesionproperties.

However, in this case also the suggested solution shows a drawback in that the growth of said animal and/or vegetable formations or encrustations is not avoided.

It has now, surprisingly, been found that fluorinated polyisocyanates, to be used as base polymers for the preparation of varnishes endowed with very high water-repellence, low surface critical tension, and low coefficient of friction are those having high functionality, obtained by reacting a hydroxy-terminated perfluoropolyether, an organic diisocyanate, and a polyol, preferably a low molecular weight polyol, having at least 3 functional groups.

Therefore, the object of the present invention are highly functional fluorinated polyisocyanates of the formula:

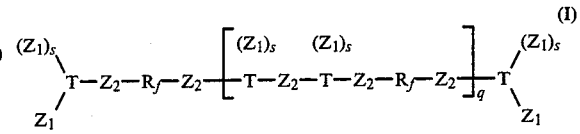

wherein $Z_1$ represents the functional group —O—CO—NH—R—NCO;

$Z_2$ is the difunctional group —O—CO—NH—R—NH—CO—O—, R being an alkylene, cycloalkylene, alkylenecycloalkylene, or an arylene radical containing from 1 to 20 C atoms;

$R_f$ is a difunctional radical derived from fluoropolyethers, having a molecular weight between 500 and 7000, and preferably between 1000 and 2500, of the following formulas:

(II)

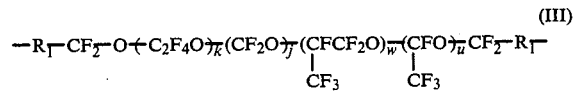
(III)

(IV)

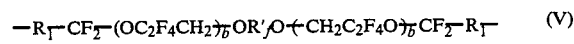
(V)

(VI)

-continued $$-R_f-CF_2-(OCF_2CF)_k-OR'_fO-(CFCF_2O)_c-CF_2-R_f- \quad (VII)$$
$$\qquad\qquad\ \ \ |\qquad\qquad\ \ |$$
$$\qquad\qquad\ \ CF_3\qquad\qquad CF_3$$

$$-R_f-CF_2-O-(CF_2CFO)_v-(CFXO)_z-CF_2-R_f- \quad (VIII)$$
$$\qquad\qquad\qquad\ \ |$$
$$\qquad\qquad\qquad CF_3$$

$$-R_f-CF_2-O-(CF_2CFO)_u-CF_2-R_f- \quad (IX)$$
$$\qquad\qquad\qquad\ \ |$$
$$\qquad\qquad\qquad CF_3$$

$$-R_f-CF_2-(OCF_2CF_2CH_2)_g-O-CF_2-R_f- \quad (X)$$

with $R_1$ selected from $-(CH_2)_x-$, $-(CH_2O)_yCH_2-$, $-(CH_2)_xOCH_2-$, wherein x, y are integers between 1 and 4, m and n are integers where the ratio m/n is between 0.2 and 2, and preferably between 0.5 and 1.2, $R'_f$ is perfluoroalkylene radical; X is F or $CF_3$; and k, j, w, u, d, b, r, c, v, z, a.g., are integers which allow one to obtain the above-said molecular weights;

T is a trivalent or tetravalent radical derived from polyols, and preferably low molecular weight polyols, such as for instance, lower than 400;

q is zero or 1; and s is 1 or 2.

Preferred highly functional fluorinated polyisocyanates of formula (I) are those wherein T is a trivalent radical, the $-NCO$ content calculated on the dry substance being between 1.5 and 8%, and preferably between 3 and 6%.

The reaction scheme which describes the preparation of the polyisocyanates of the present invention is as follows:

$$2R(NCO)_2 + HO-R_f-OH \longrightarrow \quad (1)$$

$$OCN-R-NH-CO-O-R_f-O-CO-NH-R-NCO$$
$$(A)$$

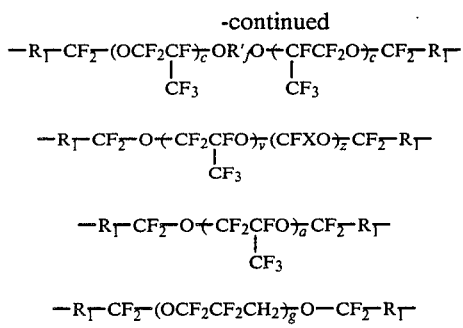

$$T(OH)_{(s+1)}-Z_2-R_f-Z_2-T(OH)_{(s+1)} + \quad (3)$$

$$2(s+1)R(NCO)_2 \longrightarrow$$

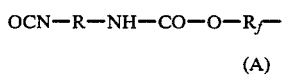

(B)

When T is a trivalent radical the reaction takes place according to the following scheme.

$$3A + 6T(OH)_3 + 11R(NCO)_2 \longrightarrow \quad (4)$$

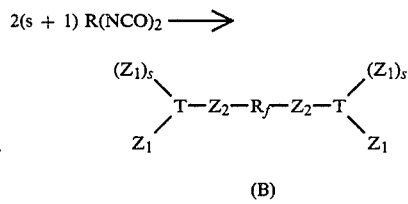

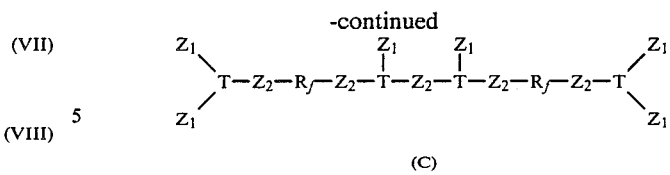

(C)

On the other hand, when T is a tetravalent radical the reaction takes place according to the following scheme:

$$3A + 6T(OH)_4 + 14.6(NCO)_2 \longrightarrow \quad (5)$$

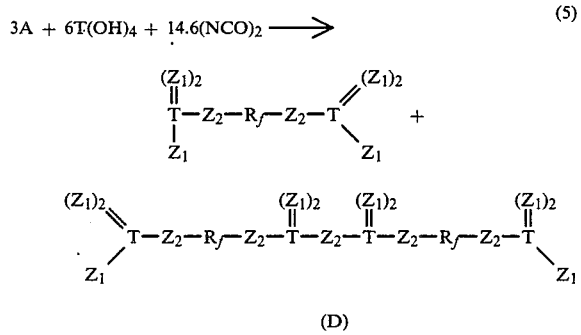

(D)

wherein R and $R_f$, $Z_1$, $Z_2$, T, s have the same meanings as described above.

The products of type A (reaction No. 1) have functionality 2. The products of type B (reaction No. 3) have functionality 4 if s is equal to 1. The same products of type B have functionality 6 if s is equal to 2. Those of type C have a functionality 5 in that the product of reaction (4) consists of an equimolar mixture of two macromolecules having functionality 4 and 6 respectively. Those of type D have a functionality 8 in that the product of reaction (5) consists of an equimolar mixture of two macromolecules having functionality 6 and 10 respectively.

According to one embodiment, the polyisocyanates of formula (I) may be obtained according to a two-step process:

(a) in a first step the diisocyanate and the perfluorinated polyether diol are completely introduced into the autoclave and are allowed to react at a temperature between 40° and 100° C.; and (b) after the end of the reaction, the polyol or a mixture of polyols is added to the thus-obtained product to give the high isocyanic functionality to the macromolecule. Also in this second step the reaction temperature is in the range from 40° to 100° C.

According to another preferred embodiment, the polyisocyanates of formula (I) can be obtained according to a three-step process:

(i) in the first step all the perfluorinated polyether diol is introduced into the autoclave together with a portion of diisocyanate, in such a manner as to have a molar ratio diisocyanate/diol equal to 2/1, as shown in equation (1) above;

(ii) in the second step, all the low molecular weight polyol is added to the intermediate product obtained in such a manner that the molar ratio between the polyol and the reaction product is about 2/1; and (iii) in the third step, after the completion of the reaction, the remaining portion of diisocyanate with molar ratio as illustrated above in equation (4) or (5) is introduced.

The reaction temperature of the three steps is between 40° and 100° C.

As the diisocyanate and the perfluorinated polyether diol are wholly immiscible and from their mixture a milky, nonhomogeneous suspension is obtained which tends to separate into an upper part (diisocyanate) and a lower part (diol), the reaction is carried out in the presence of a solvent. Said solvent even though it may be dissolve a small amount of perfluorinated polyether diol, allows the presence of fluorinated diol molecules and disocyanate molecules in the reaction medium in homogeneous phase.

The NCO-terminated intermediate reaction product (A) is perfectly soluble and can itself act as solvent for the not-yet-reacted perfluorinated polyether diol.

The solvent used is stable at the reaction temperature and is inert in respect of the reagents and of the final reaction product.

Examples of suitable solvents are: dimethylformamide, chlorinated solvents such as trichloroethylene, tetrachloroethane, etc.; and organic solvents containing in the molecule an ester-ether group such as polyoxymethylene monoethyl-ether acetate, polyoxyethylene monobutyl-ether acetate, polyoxybutylene mono-ethylether acetate, polyoxy-butylene monobutyl-ether acetate, polyoxyethylene diacetate, polyoxybutylene diacetate, cellosolve acetate, ethylene glycol diacetate, butylene glycol diacetate, etc.

In order to increase the kinetics of the reaction, it is preferable to work in the presence of suitable catalysts. Examples of such catalysts are: tertiary amines such as triethylene diamine; N-ethyl-imine, tetramethylguanidine, dimethylcyclohexylamine, etc., organometallic promoters such as dibutyltindilaurate, tin octoate, cobalt naphthenate, vanadium acetylacetonate, dimethyltin-diethylhexanoate, and mixtures thereof.

Preferred catalysts are triethylenediamine and dibutyltindilaurate. The catalysts are used in catalytic concentrations and generally not higher than 0.1% by weight.

Any diisocyanate of the general formula:

OCN—R—NCO may be used for preparing the highly functional fluorinated polyisocyanates of formula (I) of the present invention. Examples of diisoyanates which may be used are 2,4-toluenediisocyanate alone or mixed with the isomer 2,6-toluenediisocyanate, 4,4'-diphenylmethanediisocyanate, 4,4'-dicyclohexyl-methanediisocyanate; 1-isocyanato-3-isocyanato-methyl-3,5,5-trimethylcyclohexane (or isoforondiisocyanate); 2,2,4-trimethylhexamethylene-diisocyanate mixed with the isomer 2,4,4-trimethylhexamethylene-diisocyanate, ethylidenediisocyanate, butylene-diisocyanate, pentamethylene-diisocyanate, hexamethylene-diisocyanate, cyclopentylene-1,3-diisocyanate, cyclohexylene-1,4-diisocyanate, cyclohexylene-1,2-diisocyanate, xylylene-diisocyanate, dichloro-hexamethylene-di-isocyanate, dicyclohexyl-4,4'-diisocyanate, 1,2-di(isocyanatomethyl)cyclobutane, 1-methyl-2,4-diisocyanato-cyclohexane, 1-methyl-2,6-diisocyanato-cyclohexane, etc.; aliphatic diisocyanates containing ether groups such as 1,3-bis(γ-isocyanatopropoxy)-2,2-dimethylpropane, etc. Among these, the aliphatic diisocyanates such as isoforondiisocyanate are preferred.

Any hydroxy-ended fluoropolyether of general formula:

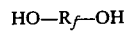

may be used for the preparation of the highly functional fluorinated polyisocyanates of formula (I). As an example may be mentioned α,ω-bis-(hydroxymethyl)polyoxyperfluoroalkylene (M.W. 2000) produced and commercialized by Montefluos S.P.A. under the trade name Fomblin Z-DOL.

Fluoropolyethers of formulae (II) to (X) may be obtained according to the processes disclosed in U.S. Pat. Nos. 3,242,218; 3,665,041; 3,250,808; 3,810,874; and 4,523,039, and in European patent application Nos. 148,482; 151,877; 165,649; and 165,650.

Any polyol having trivalent or tetravalent functionality and preferably of low molecular weight may be used for the synthesis of the fluorinated polyuisocyanates according to the present invention. Thus, polyols having a molecular weight lower than 400, such as trimethylol propane, trimethylolethane, glycerine, 1,2,6-hexanetrial, and ethoxylated or propoxylated pentaerythritol are preferred. The polyols may be used alone or in admixtures.

The highly functional fluorinated polyisocyanates of formula (I), mixed with their reaction solvent, may be directly used as varnishes.

Varnishes obtained from the highly functional polyisocyanates of formula (I) in solution of their reaction solvent or further diluted are still another object of the present invention.

Polyisocyanates of formula (I) may be used for the preparation of varnishes both alone and in admixtures.

As dilution solvents either the reaction solvents themselves or products compatible with them may be used, such as toluene, xylenes, acetates of the formula $CH_3$—$COO$—$R_2$, wherein $R_2$ is linear or branched alkyl radical containing from 2 to 6 carbon atoms, or ketones of the formula $R_3$—$CO$—$R_4$, wherein $R_3$ and $R_4$ are linear or branched alkyl radicals containing from 1 to 5 carbon atoms, etc.

Generally used additives such as pigments and extenders may be added to the thus-obtained varnish. The additives must be inert products, that is they must not contain groups that react with the isocyanic groups of the fluorinated polyisocyanate of formula (I).

Pigments and fillers may be used to improve the surface characteristics, such as consistency, hardness and resistance to moisture, stability of the coloration, etc. of the varnish after application and drying on the treated surface. Pigment can be chosen from among the conventional natural, inorganic synthetic and organic synthetic pigments.

The fluorinated polyisocyanates of formula (I) used for preparing the varnishes of the present invention are sufficiently fluorinated to be compatible with fillers such as polytetrafluoroethylene, polyfluoroethylenepropylene, etc.

These extenders can be added in large amounts, such as for instance, up to 50% by weight. Fillers, as well as inert pigments and any other type of additives, are added to the dispersion in a very fine form, generally with particle sizes lower than 100 microns.

Varnishes of the present invention are characterized by very high water-repellence, low surface critical tension and low coefficient of friction.

The fact that the coefficient of friction is very low provides the varnish with a very good anti-fouling ability due to the lack of "anchorage" points for the development and growth of animal and/or vegetable formations.

The varnishes of the present invention, after application and drying are characterized by the following properties:
- contact angle: between 100° and 110°; measured according to the ATICELCA MC 21-72 method;
- coefficient of friction between 0.1 and 0.3, measured according to the ASTM D 1894-78 method;
- adherence: equal to 0, measured according to DIN 53151 method;
- Sward hardness: between 40 and 70, measured according to the ASTM D 2134-66 method;
- salt spray resistance: higher than 1000 hours, measured according to the ASTM B 117-73 standard; and
- very good resistance to sunlight and U.V. radiations.

For a still better understanding the present invention and how practically to perform it, some illustrative but not limitative examples are now given:

EXAMPLE 1

Into a 250 cc. reactor provided with stirrer, thermometer, and reflux cooler, there are introduced, under nitrogen, 60 g (0.0283 mol) of Fomblin Z-DOL 2000 (molecular weight 1058); 29.58 g (0.17 mol) of toluene diisocyanate; 48.06 g of cellosolve acetate; and 0.02 g of triethylenediamine.

The mixture is slowly heated for half an hour at 70° C. At this temperature, the originally milky mixture becomes clear. It is then heated at 80° C. and kept at this temperature for 1 hour. After cooling at 55° C., 7.59 g (0.0567 mol) of trimethylolpropane dissolved at 60° C. in 48.6 g of cellosolve acetate are added. The whole is slowly heated over half an hour at 80° C. and the temperature is kept at that level for 1 hour and a half. After having cooled to 40° C., the solution is discharged from the reactor. The solution has an NCO content equal to 2.55% (theoretical 2.45%).

The thus-obtained reaction mixture is diluted with cellosolve acetate up to 30% by weight of the dry substance and is then applied to a glass plate as a film which, after drying in air for 7 days at room temperature (25° C.), has a thickness of 30 microns.

The characteristics of the paint are summarized in Table 1.

TABLE 1

| Characteristic | Units | Value | Measurement Method |
|---|---|---|---|
| Contact angle | degrees | 107 | ATICELCA MC 21-72 |
| Coefficient of friction | — | 0.26 | ASTM D1894-78 |
| Sward hardness | — | 50 | ASTM D2134-66 |
| Adherence | — | 0 | DIN 53151 |
| Moisture resistance | hours | >1000 | ASTM D2247-68 |
| Salt spray resistance | hours | >1000 | ASTM B 117-73 |
| Resistance to Radiations: | | | |
| Sun lamp (2) 200 hours | ΔE(1) | 10 | ASTM D2244-79 (Scale B2) |
| U.V. Lamp (3) 15 hours | ΔE(1) | 3.8 | ASTM D2244-79 (Scale B2) |
| U.V. Lamp 50 hours | ΔE(1) | 5.5 | |

(1) color change
(2) lamp OSRAM GUR 53 300W
(3) a couple of utraviolet lamps Philips model HPK 125W

EXAMPLE 2

Into a 250 cc reactor provided with stirrer, thermometer, and reflux cooler, there are introduced, under nitrogen, 60 g (0.0283 mol) of Fomblin Z-DOL 2000 (molecular weight 1058); 27.9 g (0.16 mol) of toluene diisocyanate; 37.8 g of cellosolve acetate; and 0.02 g of triethylenediamine.

Over a half hour the mixture is slowly heated at 70° C. At this temperature, the originally milky mixture becomes clear. It is then heated at 80° C. and kept at this temperature for 1 hour. After cooling to 55° C., 7.59 g (0.0567 mol) of trimethylolpropane dissolved at 60° C. in 25.9 g of cellosolve acetate are added. The whole is slowly heated over a half hour at 80° C. and kept at this temperature for 1 hour. The whole is cooled to 40° C. and discharged from the reactor. The NCO content of the solution is 2.6% (theoretical 2.49%).

The varnish is prepared and applied according to the procedure of Eample 1. The resulting characteristics are reported in Table 2.

TABLE 2

| Characteristic | Units | Value | Measurement Method |
|---|---|---|---|
| Contact angle | degrees | 103 | ATICELCA MC 21-72 |
| Coeffieient of friction | — | 0.23 | ASTM D1894-78 |
| Sward hardness | — | 46 | ASTM D2134-66 |
| Adherence | — | 0 | DIN 53151 |
| Moisture resistance | hours | >1000 | ASTM D2247-68 |
| Salt spray resistance | hours | >1000 | ASTM B 117-73 |
| Resistance to Radiations: | | | |
| Sun lamp (2) 200 hours | ΔE(1) | 9 | ASTM D2244-79 (Scale B2) |
| U.V. Lamp (3) 15 hours | ΔE(1) | 3.4 | ASTM D2244-79 (Scale B2) |
| U.V. Lamp 50 hours | ΔE(1) | 5.4 | |

EXAMPLE 3

Into a 500 cc reactor provided with stirrer, thermometer, and reflux cooler, there are introduced, under nitrogen, 130.0 g (0.074 mol) of Fomblin Z-DOL 2000 (molecular weight 877); 93.4 g (0.420 mol) of isoforondiisocyanate; 81.0 g of cellosolve acetate; and 0.056 g of dibutyltindilaurate. The mixture is slowly heated over a half hour at 77° C. At this temperature the originally milky mixture becomes clear.

The whole is then heated at 80° C. and kept at this temperature for 1 hour. After cooling to 55° C., 19.86 g (0.1482 mol) of trimethylolpropane dissolved at 60° C. in 81.0 g of cellosolve acetate are added. The mixture is slowly heated over a half hour at 80° C. and kept at this temperature for 3 hours. 36.8 g of cellosolve acetate are added and the whole is discharged from the reactor at 40° C. The NCO content of the solution is 2.6% (theoretical 2.34%). A varnish is prepared and applied according to the procedure of Example 1. The resulting characteristics are reported in Table 3.

TABLE 3

| Characteristic | Units | Value | Measurement Method |
|---|---|---|---|
| Contact angle | degrees | 104.6 | ATICELCA MC 21-72 |
| Coefficient of friction | — | 0.29 | ASTM D1894-78 |
| Sward hardness | — | 66 | ASTM D2134-66 |
| Buchholz hardness | | 90–100 | ISO 2815 |
| Persos pendulum hardness | | 207 | ISO 1520 |
| Adherence | — | 0 | DIN 53151 |
| Moisture resistance | hours | >1000 | ASTM D2247-68 |
| Salt spray resistance | hours | >1000 | ASTM B117-73 |

TABLE 3-continued

| Characteristic | Units | Value | Measurement Method |
|---|---|---|---|
| Resistance to Radiations: | | | |
| Sun lamp (2) | 200 hours | ΔE(1) | 0.4 ASTM D2244-79 (Scale B2) |
| Sun lamp (2) | 500 hours | ΔE(1) | 0.4 |
| U.V. Lamp (3) | 15 hours | ΔE(1) | 0.1 ASTM D2244-79 (Scale B2) |
| U.V. Lamp | 50 hours | ΔE(1) | 0.14 |

EXAMPLE 4

Into a 500 cc reactor provided with stirrer, thermometer and reflux cooler, there are introduced under nitrogen 70.0 g (0.0399 mol) of Fomblin Z-DOL 2000 (Equivalent weight 877); 17.74 g (0.0798 mol) of isoforondiisocyanate; 20.0 g of cellosolve acetate; and 0.056 g of dibutyltindilaurate.

The mixture is slowly heated over 20 minutes at 60° C. At this temperature, the originally milky mixture becomes clear. The mixture is then heated at 80° C. and kept at this temperature for 20 minutes. After cooling to 55° C., 10.7 g (0.0798 mol) of trimethylolpropane dissolved in 40 g of cellosolve acetate are added. The whole is heated slowly over 1 hour at 80° C. and kept at this temperature for 2 hours. After cooling to 55° C., 35.49 g (0.1596 mol) of isoforondiisocyanate dissolved in 29.28 g of cellosolve acetate are added. The mixture is slowly heated over 1 hour at 80° C. and kept at this temperature for 1 hour. Thereafter, 44.64 g of cellosolve acetate are added and the whole is kept at 80° C. for a further two hours. The whole is cooled to 50° C. and discharged. The NCO content of the solution is 2.8% (theoretical 2.5%). The varnish is prepared and applied according to the procedure of Example 1. The resulting characteristics are reported in Table 4.

TABLE 4

| Characteristic | Units | Value | Measurement Method |
|---|---|---|---|
| Contact angle | degrees | 105.4 | ATICELCA MC 21-72 |
| Coefficient of friction | — | 0.18 | ASTM D1894-78 |
| Sward hardness | — | 54 | ASTM D2134-66 |
| Adherence | — | 0 | DIN 53151 |
| Moisture resistance | hours | >1000 | ASTM D2247-68 |
| Salt spray resistance | hours | >1000 | ASTM B 11-73 |
| Resistance to Radiations: | | | |
| Sun lamp (2) | 200 hours | ΔE(1) | 0.1 ASTM D2244-79 (Scale B2) |
| Sun lamp (2) | 500 hours | ΔE(1) | 0.2 |
| U.V. Lamp (3) | 15 hours | ΔE(1) | 0.1 ASTM D2244-79 (Scale B2) |
| U.V. Lamp | 50 hours | ΔE(1) | 0.2 |

What is claimed is:

1. A highly functional fluorinated polyisocyanate of formula:

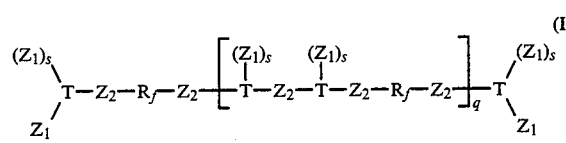
(I)

wherein
$Z_1$ represents the functional group —O—CO—NH—R—NCO;

$Z_2$ represents the difunctional group —O—CO—NH—R—NH—CO—O—, R being an alkylene, cycloalkylene, alkylene-cycloalkylene or arylene radical containing from 1 to 20 carbon atoms;

$R_f$ represents a difunctional radical derived from a fluoropolyether having an average molecular weight between 500 and 7000, and preferably between 1000 and 2500;

T represents a trivalent or tetravalent radical derived from a polyol, preferably having a low molecular weight;

q is zero or 1; and
s is 1 or 2.

2. A fluorinated polyisocyanate according to claim 1, wherein the $R_f$ radical is selected from among those having the formula:

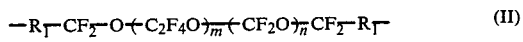 (II)

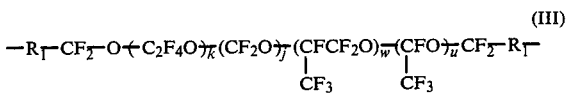 (III)

 (IV)

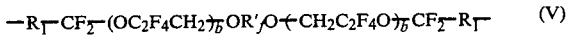 (V)

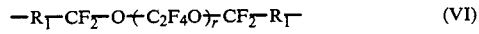 (VI)

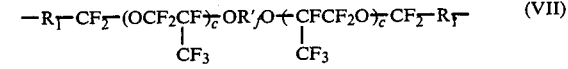 (VII)

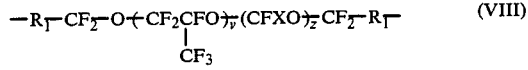 (VIII)

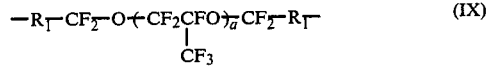 (IX)

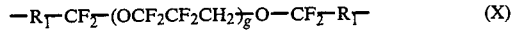 (X)

with
$R_1$ selected from: —(CH$_2$)$_x$—, —(CH$_2$O)$_y$CH$_2$—, —(CH$_2$)$_x$OCH$_2$—;
x, y are integers between 1 and 4;
m, n are integers having the ratio m/n between 0.2 and 2, are preferably between 0.5,
$R'_f$ is a perfluoro alkylene radical;
X is F or CF$_3$; and
k, j, w, u, d, b, r, c, v, z, a, g are integers which allow one to obtain the above-said molecular weights.

3. A fluorinated polyisocyanate according to claim 1 or 2, wherein T represents a trivalent or tetravalent radical derived from a polyol having a molecular weight lower than 400.

4. A fluorinated polyisocyanate according to claim 1 or 2, wherein the polyol is selected from trimethylolpropane, trimethylolethane, glycerin, 1,2,6-hexanetriol, and ethoxylated or propoxylated pentaerythritol.

5. A fluorinated polyisocyanate according to claim 1 or 2, wherein the diisocyanate is an aliphatic diisocyanate.

6. A fluorinated polyisocyanate according to claim 5, wherein the diisocyanate is isoforondiisocyanate.

7. A fluorinated polyisocyanate according to claim 1 or 2, wherein T represents a trivalent radical derived from polyols having a molecular weight lower than 400.

8. A fluorinated polyisocyanate according to claim 7, wherein the NCO content based on the dry substance is between 1.5 and 8%, and preferably between 3 and 6%.

9. A varnish containing a highly functional fluorinated polyisocyanate of formula (I) as shown in claim 1.

10. A varnish according to claim 9, wherein the polyisocyanate is dissolved in a solvent selected from dimethylformamide, a chlorinated solvent and an organic solvent containing in the molecule an ester-ether group.

11. A varnish according to claim 9, having present a fluorinated filler up to 50% by weight.

12. A varnish according to claim 11, wherein the fluorinated filler is chosen from polytetrafluorethylene and polyfluoroethylenepropylene.

13. A varnish according to claim 12, having the following characteristics after drying:
a contact angle between 100° and 110°; a coefficient of friction between 0.1 and 03; an adherence equal to zero; a Sward hardness between 40 and 70; and a salt resistance higher than 1000 hours.

14. A process for the preparation of a fluorinated polyisocyanate according to claim 1, comprising:
(a) reacting a diisocyanate of the formula:

$$OCH-R-NCO$$

at a temperature between 40° and 100° C. with a perfluorinated diol of the formula:

$$HO-R_f-OH$$

wherein R and $R_f$ are as defined in claim 1;
(b) reacting the thus-obtained reaction product with a polyol or mixture of polyols, preferably having low molecular weight, having functionality 3 or 4, at temperatures between 40° and 100° C.

15. A process for the preparation of a fluorinated polyisocyanate according to claim 1, which comprises:
(i) reacting the entire amount of a polyetherperfluorinated diol with one portion of diisocyanate, in such a manner as to have a molar ratio diisocyanate/diol equal to 2/1;
(ii) adding to the thus-obtained product the remaining amount of polyol in such a manner that the molar ratio between the polyol and the reaction product is 2/1; and
(iii) adding, after the completion of the reaction, the remaining portion of the diisocyanate.

* * * * *